United States Patent
Kim et al.

(10) Patent No.: US 8,085,818 B2
(45) Date of Patent: Dec. 27, 2011

(54) FRAME SYNCHRONIZATION AND STRUCTURE DETECTION METHOD IN DVB-S2 SYSTEM

(75) Inventors: Pan-Soo Kim, Daejon (KR); Dae-Ig Chang, Daejon (KR); Deock-Gil Oh, Daejon (KR); Sangtae Kim, Seoul (KR); Seokheon Kang, Seoul (KR); Wonjin Sung, Seoul (KR)

(73) Assignees: Electronics and Telecommunications Research Institue, Daejon (KR); Industry-University Cooperation Foundation Sogang Unniversity, Seoul (KR)

( * ) Notice: Subject to any disclaimer, the term of this patent is extended or adjusted under 35 U.S.C. 154(b) by 206 days.

(21) Appl. No.: 12/518,242

(22) PCT Filed: Oct. 31, 2007

(86) PCT No.: PCT/KR2007/005452
§ 371 (c)(1),
(2), (4) Date: Jun. 8, 2009

(87) PCT Pub. No.: WO2008/069452
PCT Pub. Date: Jun. 12, 2008

(65) Prior Publication Data
US 2010/0007743 A1   Jan. 14, 2010

(30) Foreign Application Priority Data
Dec. 8, 2006   (KR) .................. 10-2006-0124831

(51) Int. Cl.
  *H04J 3/06*   (2006.01)
(52) U.S. Cl. ........................ 370/509; 375/365
(58) Field of Classification Search .......... 370/509–514; 375/359–362; 348/194
See application file for complete search history.

(56) References Cited

U.S. PATENT DOCUMENTS

| | | | |
|---|---|---|---|
| 5,420,640 A | 5/1995 | Munich et al. | |
| 7,006,577 B2 | 2/2006 | Kim | |
| 7,006,587 B1 | 2/2006 | Lewis et al. | |
| 7,308,064 B2 * | 12/2007 | Kim et al. | 375/365 |
| 7,443,920 B2 * | 10/2008 | Thesling et al. | 375/269 |
| 2003/0076779 A1 | 4/2003 | Frank et al. | |
| 2008/0285591 A1 * | 11/2008 | Kim et al. | 370/470 |
| 2010/0322366 A1 * | 12/2010 | Kim et al. | 375/362 |

FOREIGN PATENT DOCUMENTS

| | | |
|---|---|---|
| EP | 0 580 287 | 1/1994 |
| KR | 1999-0057694 | 7/1999 |
| KR | 2002-0014065 | 2/2002 |
| KR | 10-0330196 | 3/2002 |
| KR | 2004-0107437 | 12/2004 |
| KR | 2005-0066562 | 6/2005 |
| KR | 2007-0061034 | 6/2007 |

* cited by examiner

OTHER PUBLICATIONS

Feng-Wen Sun et al., "Frame synchronization and pilot structure for second generation DVB via satellites", Int. J. Satell. Commun. Network, vol. 22, pp. 319-339, 2004.

*Primary Examiner* — Gary Mui
(74) *Attorney, Agent, or Firm* — Rabin & Berdo, P.C.

(57) ABSTRACT

Provided is a method for detecting frame sync and frame structure in a satellite broadcasting system. The method for detecting frame sync and frame structure includes the steps of: calculating differential correlation values of reception symbols; generating index sequences of reception symbols whose differential correlation values calculated above exceed a threshold value; calculating positions estimated as frame start points which correspond to a total frame number based on the number of symbols per frame for each frame structure; and detecting frame sync and frame structure based on the umber of positions where the above-calculated frame start point estimated positions and the above-generated index sequences are matched.

5 Claims, 6 Drawing Sheets

FRAME SYNCHRONIZATION AND STRUCTURE DETECTION METHOD IN DVB-S2 SYSTEM

TECHNICAL FIELD

The present invention relates to a method for detecting frame sync and frame structure in a satellite broadcasting system; and, more particularly, to a frame sync and structure detecting method that can calculate differential correlation values of reception symbols, generate index sequences of the symbols exceeding a threshold value, and detects a frame sync and frame structure at positions estimated as frame start points corresponding to a total number of frames according to the number of positions where the above-generated index sequences are matched by using the number of symbols per frame for each frame structure in a satellite broadcasting system.

This work was supported by the IT R&D program of MIC/IITA [2005-S-013-02, "Development of Broadband Adaptive Satellite Communications and Broadcasting Convergence Technology"].

BACKGROUND ART

Specific embodiments of the present invention will be described by taking a Digital Video Broadcasting-Satellite 2 (DVB-S2) as an example of a satellite broadcasting system.

As the boundary between broadcasting and communication becomes obscure and bi-directional services are available recently, it is required to develop broadband services and reliable transmission services. Thus, satellite broadcasting systems which require high transmission capacity with given bandwidths and signal power adopt adaptive modulation and coding methods.

Particularly, the European standard for digital video satellite broadcasting, i.e., DVB-S2, utilizes adaptive modulation and coding methods which select optimal modulation scheme and coding rate adaptive to channel conditions. The use of the adaptive modulation and coding methods allows receivers of a satellite communication system to control links adaptively to propagation conditions and thereby acquire transmission capacity up to about 100 to 200%.

However, each receiver of the satellite communication system adopting the transmission method essentially requires a frame structure detection process for identifying a varied transmission frame and a frame sync detection process for detecting the start point of a frame.

Generally, the performance in the frame sync detection process and the frame structure detection process that are carried right after symbol synchronization in the initial synchronization mode are significant parameters that become basic assumption for acquiring performance required in the entire system.

One of the methods for detecting frame sync is to estimate the start point of a frame by deciding reliability of correlation analysis values after correlation analysis. According to the method, correlation values are all stored in a method applicable to the decision of reliability of correlation analysis and the maximum value among them is used. According to a conventional frame detection method using a maximum value, frame sync is detected based on a maximum value of correlation analysis values within a predetermined section of a DVB-S2 frame structure, and the frame structure and frame sync position are detected through Reed Muller (64.7) decoding of physical layer signaling code (PLSC) bits.

However, the conventional frame detection method requires an additional process for correcting frequency and phase errors in the PLSC decoding. In addition, a process of detecting accurate position information of a frame should precede the PLSC decoding. Therefore, there is a limit in applying the conventional frame detection method to an environment with frequency errors.

Particularly, the conventional frame detection method using a maximum value has a problem in that it requires a high-volume memory space and high complexity.

Meanwhile, according to another conventional frame detection method, frames with variable length are segmented based on predetermined segmentation rules to be transmitted in the form of multiple coded streams and added with a sync flag. Then, frame structure and frame sync position of transmitted frames are detected based on flags upon reception. Therefore, the technology cannot be applied to frames with fixed sync words, such as frames of a DVB-S2 system.

DISCLOSURE

Technical Problem

Embodiments of the present invention have been devised to solve the above problems.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for detecting frame sync and frame structure in a satellite communication system, the method which includes the steps of: calculating differential correlation values of reception symbols; generating index sequences of reception symbols whose differential correlation values calculated above exceed a threshold value; calculating positions estimated as frame start points which correspond to a total frame number based on the number of symbols per frame for each frame structure; and detecting frame sync and frame structure based on the number of positions where the above-calculated frame start point estimated positions and the above-generated index sequences are matched.

Also, the present invention provides a method for detecting frame sync and frame structure of a transmission frame in consideration of a frequency error and complexity of a receiver in a satellite communication system where a frame structure of a transmission frame is variable through adaptive modulation and coding schemes.

The method of the present invention utilizes a threshold value to decide reliability of a correlation analysis value and applies differential correlation analysis in consideration of a frequency error occurrence environment.

The method of the present invention can reduce memory space by storing only index values of correlation values that have passed through a threshold test.

In addition, the method of the present invention provides a solution for overcoming mis-detection and false-alarm occurring in the course of the threshold test. Herein, mis-detection means a case when a correlation analysis value at a point where synchronization occurs is smaller than a threshold value and thus detection is failed. False-alarm signifies a case where a correlation analysis value at a point where synchronization does not occur is larger than the threshold value and thus detection is failed.

Advantageous Effects

The frame sync and structure detecting method of the present invention can calculate differential correlation values of reception symbols, generate index sequences of the symbols exceeding a threshold value, and detects a frame sync and frame structure at positions estimated as frame start points corresponding to a total number of frames according to the number of positions where the above-generated index sequences are matched by using the number of symbols per frame for each frame structure in a satellite broadcasting system. The frame sync and structure detecting method can detect frame sync and frame structure with low complexity and small memory capacity.

Also, the method of the present invention can reduce memory space in a receiver for a satellite broadcasting system employing adaptive modulation and coding schemes.

In addition, the method of the preset invention can improve performance of a receiver by overcoming mis-detection and false-alarm that may occur in the course of hard decision for storing data in a memory.

BEST MODE FOR THE INVENTION

The advantages, features and aspects of the invention will become apparent from the following description of the embodiments with reference to the accompanying drawings, which is set forth hereinafter. When it is considered detailed description on a related art may obscure the point of the present invention, the description will not be provided. Hereinafter, specific embodiments of the present invention will be described in detail with reference to the accompanying drawings.

Figure 1:
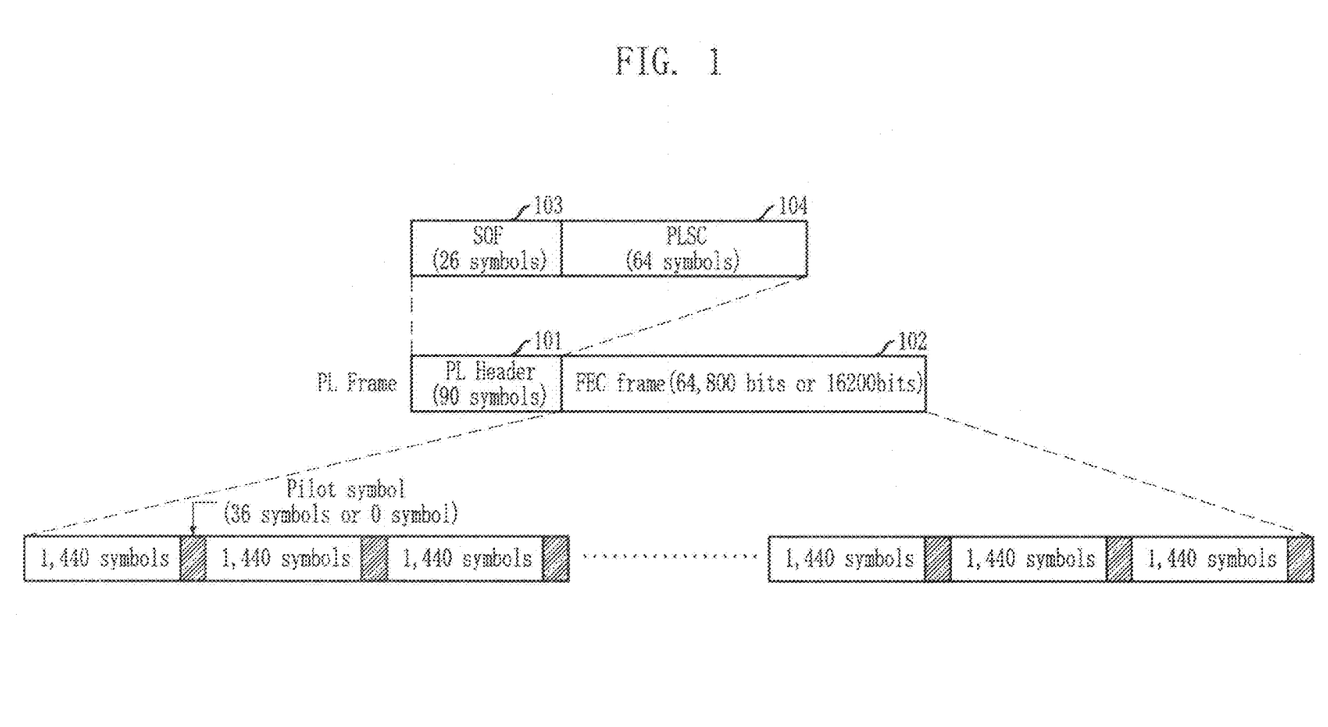
FIG. 1 illustrates a transmission frame of a Digital Video Broadcasting-Satellite 2 (DVB-S2) system in accordance with an embodiment of the present invention.

FIG. 1 illustrates a transmission frame of a Digital Video Broadcasting-Satellite 2 (DVB-S2) system in accordance with an embodiment of the present invention.

Referring to FIG. 1, the transmission frame of the DVB-S2 system, to which the present invention is applied, includes a Start of Frame (SOF) 103 having 26 symbols, a physical layer (PL) header 101 including a physical layer signaling code (PLSC) 104 having 62 symbols, and a forward error correction (FEC) frame 102 having a pilot symbol and data symbols. Herein, the SOF 103 is a sync word indicating the start of a frame.

Also, the PLSC 104 is a Reed Muller (RM) code word which codes a modulation scheme, a coding rate, and information on the presence of pilot symbols in a Forward Error Correction (FEC) frame.

The frame length and structure of transmission frames vary according to adaptive modulation and coding methods of a DVB-S2 system. The varying structures of transmission frames are presented in the following table 1.

TABLE 1

| Frame Structure Index (t) | Modulation Scheme | bits/frame | Presence of Pilot (number of pilot symbols) | Number of symbols per frame ($l_m$) |
|---|---|---|---|---|
| 0 | QPSK | 64800 | Present (792) | 33282 |
| 1 | QPSK | 64800 | Not present (0) | 32490 |
| 2 | QPSK | 16200 | Present (180) | 8370 |
| 3 | QPSK | 16200 | Not present (0) | 8190 |
| 4 | 8PSK | 64800 | Present (504) | 22194 |
| 5 | 8PSK | 64800 | Not present (0) | 21690 |
| 6 | 8PSK | 16200 | Present (108) | 5598 |
| 7 | 8PSK | 16200 | Not present (0) | 5490 |
| 8 | 16APSK | 64800 | Present (396) | 16686 |
| 9 | 16APSK | 64800 | Not present (0) | 16290 |
| 10 | 16APSK | 16200 | Present (72) | 4212 |
| 11 | 16APSK | 16200 | Not present (0) | 4140 |
| 12 | 32APSK | 64800 | Present (288) | 13338 |
| 13 | 32APSK | 64800 | Not present (0) | 13050 |
| 14 | 32APSK | 16200 | Present (72) | 1402 |
| 15 | 32APSK | 16200 | Not present (0) | 3330 |
| 16 | Dummy | x | x | 3330 |

*QPSK: Quadrature Phase Shift Keying
8PSK: 8-Phase Shift Keying
16APSK: 16 Amplitude Phase Shift Keying
32APSK: 32 Amplitude Phase Shift Keying The Table 1 shows 16 variable frame structures varying according to a modulation scheme (e.g., QPSK, 8PSK, 16APSK, and 32APSK), data length (e.g., 64800 and 16200 bits/frame), the number of symbols per frame, and the presence of pilot symbols. A dummy frame is also included as one of variable frame lengths. Thus, there are a total of 16 frame lengths and 17 frame structures.

Herein, m denotes the index of a transmission frame structure, and the number of symbols for each frame ($l_m$, m=0~16) is variable according to the frame structure index. Also, position information of known symbol sequences such as SOF and pilot is variable according to the number of symbols for each transmission frame.

Figure 2:
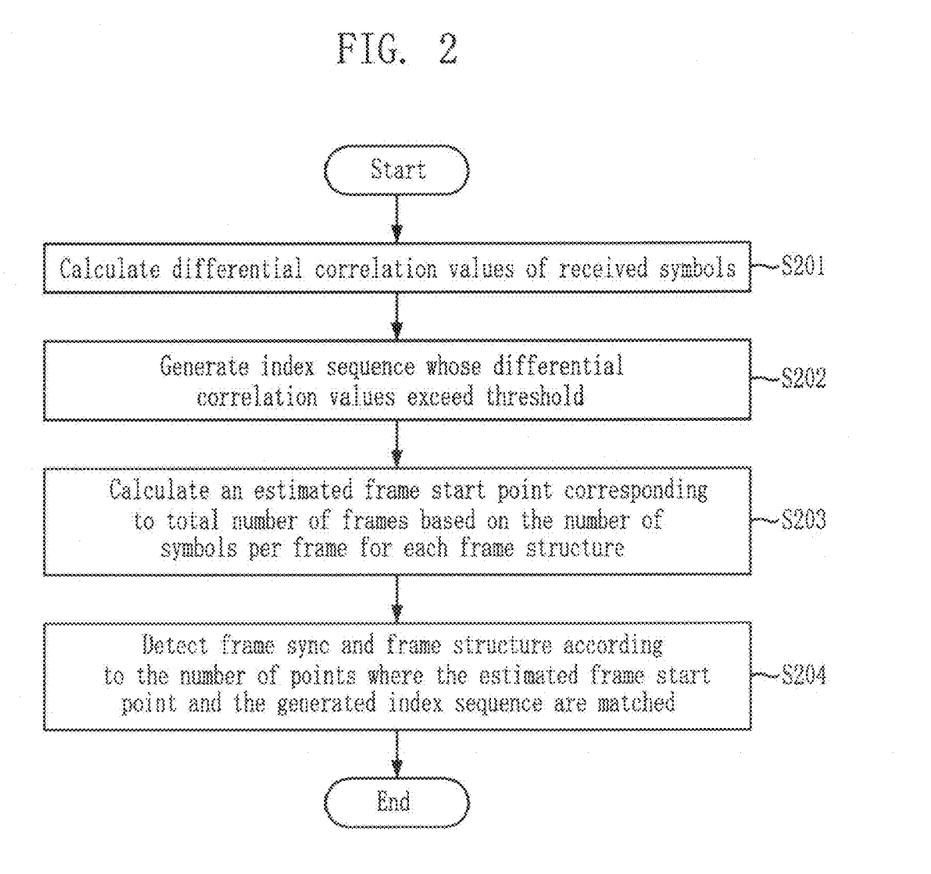
FIG. 2 is a flowchart describing a method for detecting frame sync and frame structure in a satellite communication system in accordance with an embodiment of the present invention.

FIG. 2 is a flowchart describing a method for detecting frame sync and frame structure in a satellite communication system in accordance with an embodiment of the present invention. The method of the drawing includes the steps of comparing correlation values with a threshold value for a total of $N_F$ frames, generating index sequences, and applying a detection algorithm.

Herein, the steps of comparing the correlation values with the threshold value and generating index sequences can reduce storage space in a memory through hard decision based on the threshold value ($N_{th}$). The step of applying a detection algorithm can efficiently overcome mis-detection and false-alarm that may occur in the course of the hard decision based on the threshold.

In the first place, at step S201, differential correlation values between symbols whose symbol index increases by 1 and symbols whose symbol index increases by 2 based on the following Equation 1. The Equation 1 can overcome a carrier frequency error environment of up to 20%.

$$C_i = 4\left|\sum_{k=1}^{25} \tilde{r}^*_{k,k+i} \times \tilde{r}_{k-1,k+i-1}\right| + 2\left|\sum_{k=2}^{25} \tilde{r}^*_{k,k+1} \times \tilde{r}_{k-2,k+i-2}\right|, \quad \text{Eq. 1}$$

$$\tilde{r}_{n,i} = r_i \times s^*_n$$

where i denotes a symbol position; $r_i$ denotes an $i^{th}$ reception symbol; and $s_n$ denotes an $n^{th}$ Start of Frame (SOF) symbol coefficient value.

The process of the step S201 is for calculating correlation values at the positions of $l_0 \times N_F$ symbols based on the Equation 1, when there are a total of $N_F$ frames and the number of symbols per frame is the maximum $l_0$ ($l_0$=33282) (see Table 1).

Subsequently, in step S202, index sequences of symbols whose correlation value exceeds the threshold value ($N_{th}$) are generated.

In short, it is checked whether the above-calculated correlation values exceed the threshold value.

When a correlation value does not exceed the threshold value, the position of a symbol is increased by one and a correlation value at the next symbol position is calculated.

When a correlation value exceeds the threshold value, the corresponding symbol index is stored.

The process of the step S202 is for generating index sequences. When a $k^{th}$ correlation value exceeds the threshold value and the index is $A_k$, correlation values are calculated only at a total of $l_0 \times N_F$ symbol positions. Therefore, frames are detected based on an index matching relationship when $A_k - A_0 \geq l_0 \times N_F$.

In step S203, estimated positions for frame start points corresponding to a total number of frames are calculated based on the number of symbols per frame for each frame structure. In other words, frame start points corresponding to the total number of frames are estimated based on the number of symbols per frame of the Table 1.

In step S204, frame sync and frame structure are detected based on the acquired frame start point estimated positions and the number of positions where the above-generated index sequences are matched.

Herein, the number of matched index numbers showing an optimal performance and the threshold value are presented in the following Table 2.

TABLE 2

| Number of used frames ($N_F$) | Number of detected matched indexes ($N_C$) | Normalization threshold value ($\Gamma$) | Mis-detection probability |
|---|---|---|---|
| 5 | 4 | 0.58 | $1.6 \times 10^{-3}$ |
| 10 | 6 | 0.59 | $1.8 \times 10^{-7}$ |
| 15 | 9 | 0.56 | $1.2 \times 10^{-11}$ |

Also, the dummy frame has the same symbol length per frame as frames of 32APSK, 16200-bit frame, and a frame without a pilot (which corresponds to a frame structure index 15). When index is counted on the basis of 3330-symbol length, a frame is identified at the real part of a demodulator based on automatic gain control (AGC) through SOF and a shape of constellation formed after completion of frequency sync and phase sync (which is a signal level detection) after frame sync is acquired and a temporary frame structure is detected.

The processes of the steps S203 and S204 are for overcoming mis-detection and false-alarm. In short, they are processes for determining whether matching is performed or not based on the number of symbols per frame presented in the Table 1 for the generated index sequences. This will be described more in detail with reference to FIG. 3.

Figure 3:
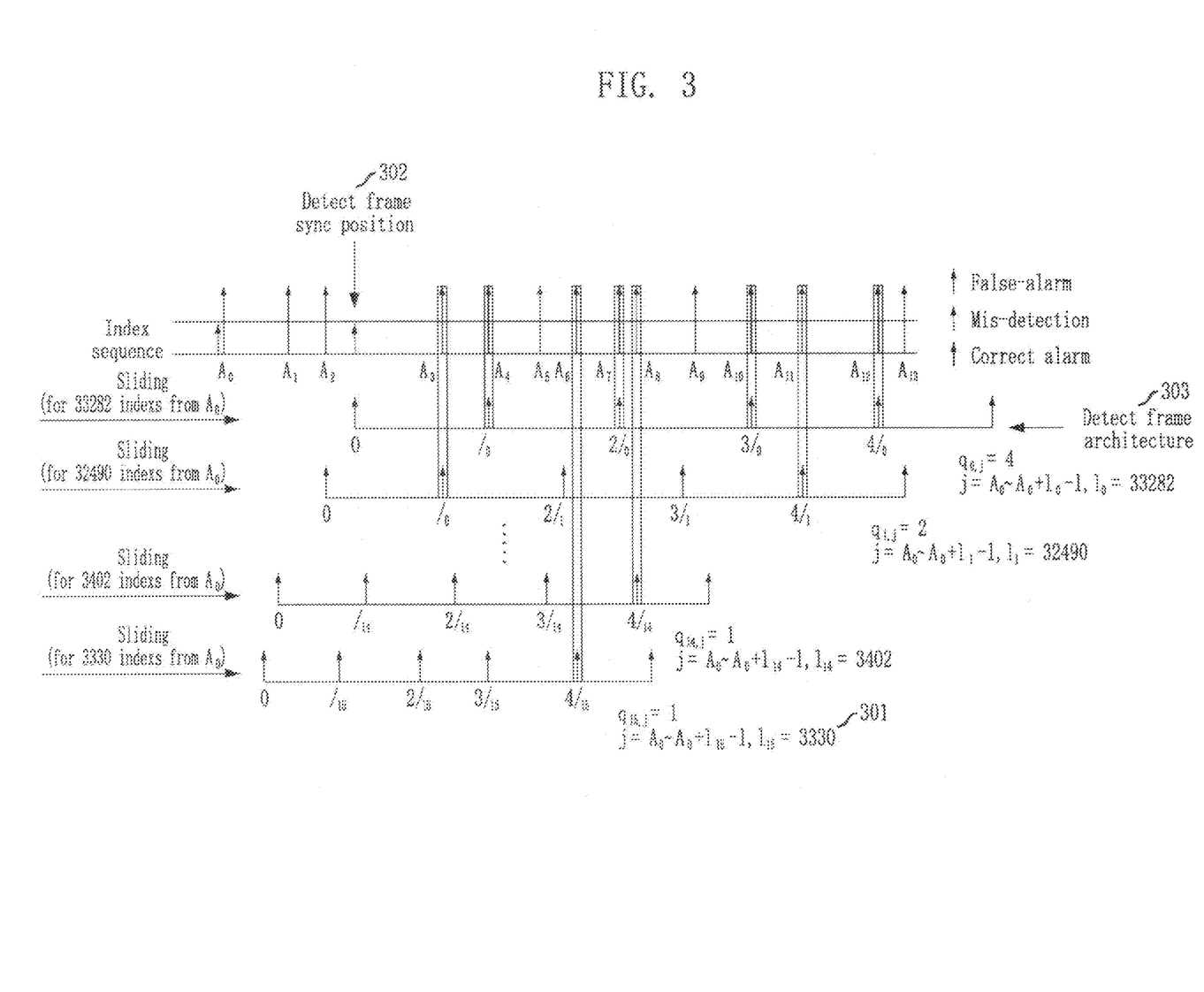
FIG. 3 illustrates a process of deciding presence of matching based on the number of symbols per frame in accordance with an embodiment of the present invention.

FIG. 3 illustrates a process for calculating the number of matched indexes when the number of used frames ($N_F$) is 6 ($N_F$=6).

To be specific, 6 positions estimated as frame start points, which is simply referred to as frame start point estimated positions, are calculated considering the number ($l_0 \sim l_{15}$) of symbols per frame for the 16 frame structures, and the number of positions where the above-generated index sequences are matched.

Herein, the values $q_{0,j}$ to $q_{15,j}$ denote values obtained by calculating the number of matched indexes for respective frame structures. The value $q_{0,j}$ denotes a value obtained by calculating the number of matched indexes for a $0^{th}$ frame structure in the Table 1, (of which the total number of symbols is 33282; the modulation scheme is QPSK; the data length is 64800 bits/frame; and pilot symbols are present. Herein, j denotes a frame sync index The value $q_{0,j}$, which is a value obtained by calculating the number of matched indexes for the $0^{th}$ frame structure, has a value j ranging from $A_0$ to $A_0+l_0-1$ (j=$A_0 \sim A_0+l_0-1$). This signifies that all possible positions where a frame start point is likely to be present are checked by calculating the number of matched indexes for all positions from a position $A_0$ where the first alarm occurs up to indexes apart from the position $A_0$ by $l_0$, when the $0^{th}$ frame structure is transmitted.

Likewise, values $q_{1,j}$ to $q_{15,j}$ can be calculated for the other 15 frame structures. In consideration of the number $l_1$ to $l_{15}$ of symbols per frame, the j value can have different ranges just as shown in the step S301. For each frame structure, the minimum value of the j value is the same, which is $A_0$. The maximum value is different according to the number of symbols per frame as shown in the step S301.

Since matched indexes are countered at four positions $A_4$, $A_7$, $A_{10}$ and $A_{12}$ in case of $q_{0,j}$ in the example of FIG. 3, the number of matched indexes is four. The number of matched indexes can be calculated in the similar method for the other 15 cases.

When the number of matched indexes is decided based on positions where a matched index is detected and the number of the matched indexes is more than four, the frame sync positions and the frame structure of transmission frames are detected as described in the steps S302 and S303. When the number of matched indexes that can be decided based on detection positions is $N_C$, $N_F$=6 and $N_C$=4 in the case of FIG. 3. This means that detection is possible even though mis-detection occurs less than twice. Conversely, it also signifies that detection occurs at wrong positions when false-alarm is accidentally made more than 4 times.

Therefore, not only the threshold value influencing on the mis-detection and false-alarm of correlation values but also $N_F$ and $N_C$ should select an appropriate value to optimize performance of frame detection.

Figure 4:
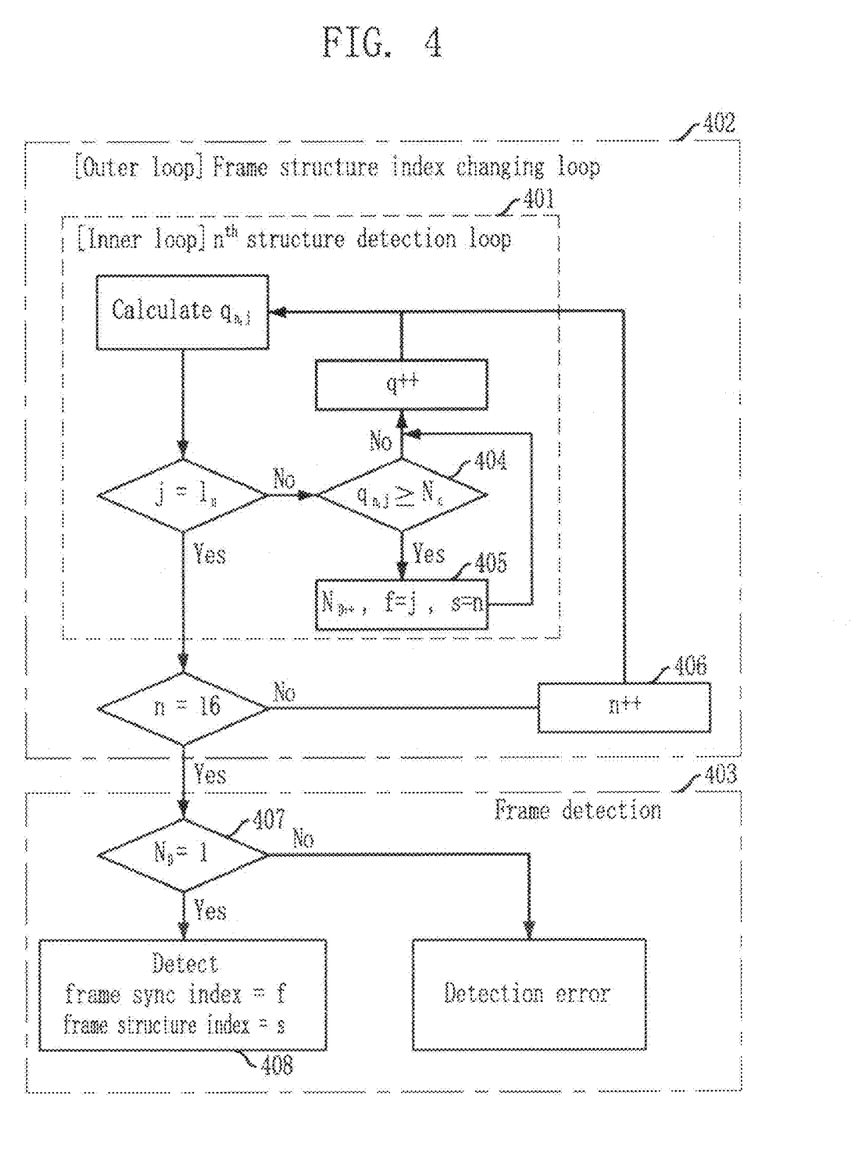
FIG. 4 describes a method for detecting frame sync and frame structure in accordance with an embodiment of the present invention.

FIG. 4 describes a method for detecting frame sync and frame structure in accordance with an embodiment of the present invention. Referring to FIG. 4, the frame sync and structure detection process of the present invention can be largely divided into an inner loop 401, an outer loop 402, and a frame detection 403. Each process is summarized as follows.

[Inner Loop]: Detection loop for detecting an $n^{th}$ frame structure (n=0~15)
  Calculate the number ($q_{n,j}$) of indexes matched in the method described in FIG. 3 with respect to an $n^{th}$ frame structure, while increasing a frame sync index j
  Determine a case of $q_{n,j} \div N_C$ shown in step S403 as a detection position, store a j value in an f position estimated as a frame sync index storing position as shown in step S404, store an n value in an s position estimated as a frame structure index storing position, and increase $N_D$ to count the number of detection position

[Outer Loop]: Loop for changing frame structure index when n<16, move to the inner loop and when n=16, move to a frame detection step S407

[Frame Detection]: Detect frame sync and frame structure when the inner loop reveals $N_D$=1 in the step S407, detection is performed using an estimated frame sync index f and an estimated frame structure index s that are estimated in step S408, and when $N_D \neq 1$, define as detection failure in the frame Since it is desirable that detection occurs only at one position while a $q_{n,j}$ value is calculated for each frame structure by increasing n from 0 to 15, a case of $N_D \neq 1$ as shown in the step S407 is defined as detection failure.

Meanwhile, the smaller the $N_C$ value is, the higher a detection success probability becomes even though detection errors occur. However, the smaller the $N_C$ value is, the higher the probability for detection failure due to false alarm becomes. Therefore, when the number ($N_F$) of used frames is given, or a frame detection limit time is given, it is necessary to assess the performance for the $N_C$ value that shows the optimal performance while varying the $N_C$ value.

The performance may be assessed by setting up a whole simulation model, but there is a limit in the respect of simulation execution time. Thus, a mathematical performance analysis model that can substitute the simulation model is set up and verified.

According to the general frame detecting method of the present invention, the number of indexes matched with $N_F$ test positions is counted and when the number is more than $N_C$, the detection method may be summarized as follows.

Therefore, the entire mis-detection probability (MDP) and the false-alarm rate (FAR) can be induced as the following Equations 2 and 3.

MDP: Eq. 2

$$p(\Gamma, N_F, N_C) = 1 - \sum_{n=N_C}^{N_F} \binom{N_F}{n} (1 - p_m(\Gamma))^n p_m(\Gamma)^{N_F - n}$$

FAR: Eq. 3

$$q(\Gamma, N_F, N_C) = \sum_{n=N_C}^{N_F} \binom{N_F}{n} q_f(\Gamma)^n (1 - q_f(\Gamma))^{N_F - n}$$

In the Equations 2 and 3, $p_m(\Gamma)$ and $q_f(\Gamma)$ denote MDP and FAR for correlation values, respectively; and $\Gamma(=N_{th}/148)$ denotes a normalized threshold value.

Since $p_m(\Gamma)$ and $q_f(\Gamma)$ signify statistical characteristics of correlation values according to the threshold value in a specific experimental environment, $p_m(\Gamma)$ and $q_f(\Gamma)$ can be expressed as functions of $\Gamma$. Also, when the whole detection method is applied, the entire MDP and FAR can be expressed as the Equations 2 and 3 because $N_F$ and $N_C$ are applied as parameters.

A probability (which is a probability for accurately detecting a frame sync index and a frame structure index) for successfully performing frame detection in $N_F$ frames by using the MDP and the FAR can be expressed as the following Equation 4.

$$p_{suc}(\Gamma, N_F, N_C) = (1 - p(\Gamma, N_F, N_C))(1 - q(\Gamma, N_F, N_C))^{N_S - 1}, \quad \text{Eq. 4}$$

$$N_S = \sum_{m=0}^{15} l_m$$

Herein, $l_m$ denotes the number of symbols per frame for an $m^{th}$ frame structure (m=0~15), and this is presented in the Table 1.

A probability (which is a probability for failing in the detection of a frame sync index and a frame structure index) for failing in performing frame detection in $N_F$ frames can be expressed as the following Equation 5.

$$p_{fail}(\Gamma, N_F, N_C) = 1 - p_{suc}(\Gamma, N_F, N_C) \quad \text{Eq. 5}$$

The Equation 5 signifies a probability for failing in detecting at least any one between the frame sync index and the frame structure index, and this is defined as a frame detection error rate, which is an index for assessing performance.

Figure 5:
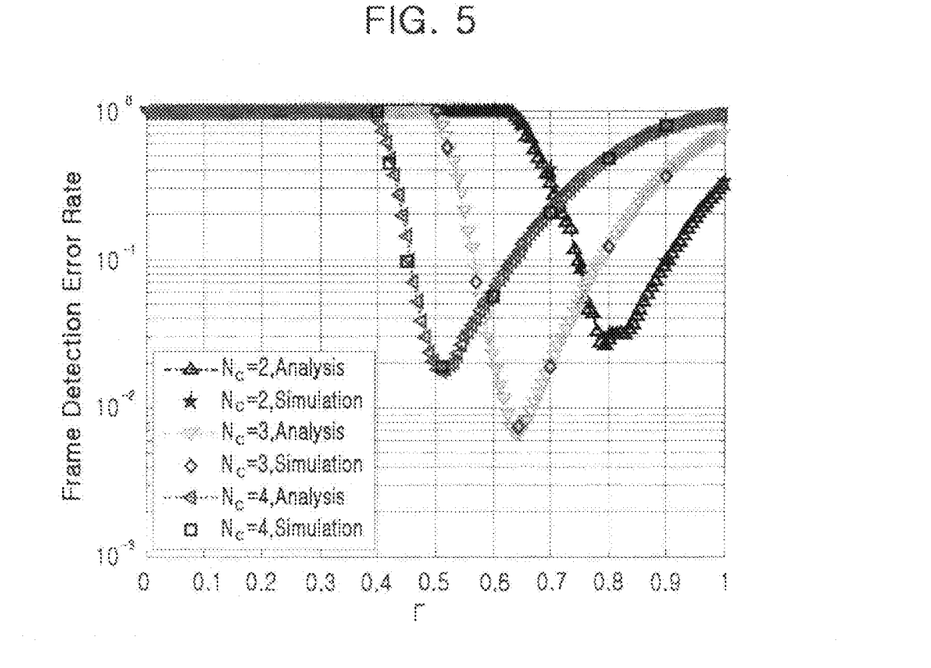
FIG. 5 shows a curve obtained by using a simulation model for a probability for failure in detecting at least any one between a frame sync index and a frame structure index in accordance with an embodiment of the present invention.

FIG. 5 shows a curve obtained by using a simulation model for a probability for failure in detecting at least any one between a frame sync index and a frame structure index in accordance with an embodiment of the present invention. Referring to FIG. 5, the normalized threshold F and performance optimal points according to variation of $N_C$ can be confirmed at $N_F$=4 and SNR=3 dB. Herein, the simulation model is agreed with a mathematical analysis model.

The $p_m(\Gamma)$ and $q_f(\Gamma)$ inputted to the Equations 2 and 3 of the mathematical analysis model are obtained by using an experimental Probability Density Function (PDF).

Detailed description on them is presented below with reference to FIGS. 6, 7 and 8. FIG. 5 shows that it is possible to apply a mathematical analysis model instead of an actual simulation model and that there are parameters at which optimal performance is shown according to the threshold value and variation of $N_C$.

Meanwhile, when $N_F$ frames are used and F=0.58 at a signal-to-noise ratio of 3 dB, the statistical result according to FIG. 5 is $q_f$ (0.58)≈3.5×10$^{-3}$, and the number of indexes substantially stored is about 33282×3.5×10$^{-3}$×$N_F$≈117×$N_F$.

Figure 6:
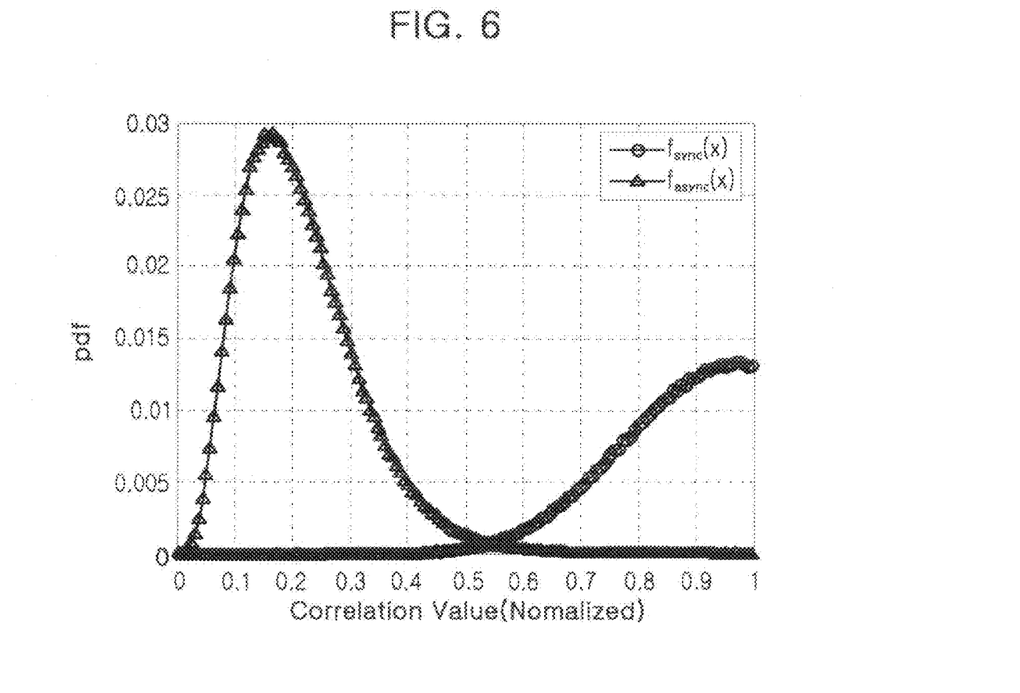
FIG. 6 is a graph showing Probability Density Function (PDF) for normalized correlation values in accordance with an embodiment of the present invention.

FIG. 6 is a graph showing Probability Density Function (PDF) for normalized correlation values in accordance with an embodiment of the present invention. The drawing shows probability density functions when the normalized correlation values are synchronized at a signal-to-noise ratio of 3 dB and when the normalized correlation values are not synchronized.

This is a curve needed to experimentally acquire the $p_m(\Gamma)$ and $q_f(\Gamma)$ of the Equations 2 and 3, and the probability density functions are marked as $f_{sync}(x)$ and $f_{async}(x)$, respectively.

A mis-detection probability (MDP) and false-alarm rate (FAR) of correlation values acquired through a threshold test based on the probability density functions during synchronization and asynchronization can be expressed as the following Equations 6 and 7.

$$p_m(\Gamma) = \int_{-\infty}^{\Gamma} f_{sync}(x)\,dx \qquad \text{Eq. 6}$$

$$q_f(\Gamma) = \int_{\Gamma}^{\infty} f_{async}(x)\,dx \qquad \text{Eq. 6}$$

Since the MDP is a probability that a correlation value is smaller than the threshold value, it can be acquired by integrating the probability density function during synchronization as shown in the Equation 6. Since the FAR is a probability that a correlation value is greater than the threshold value at an asynchronous position, it can be acquired as shown in the Equation 7.

Figure 7:
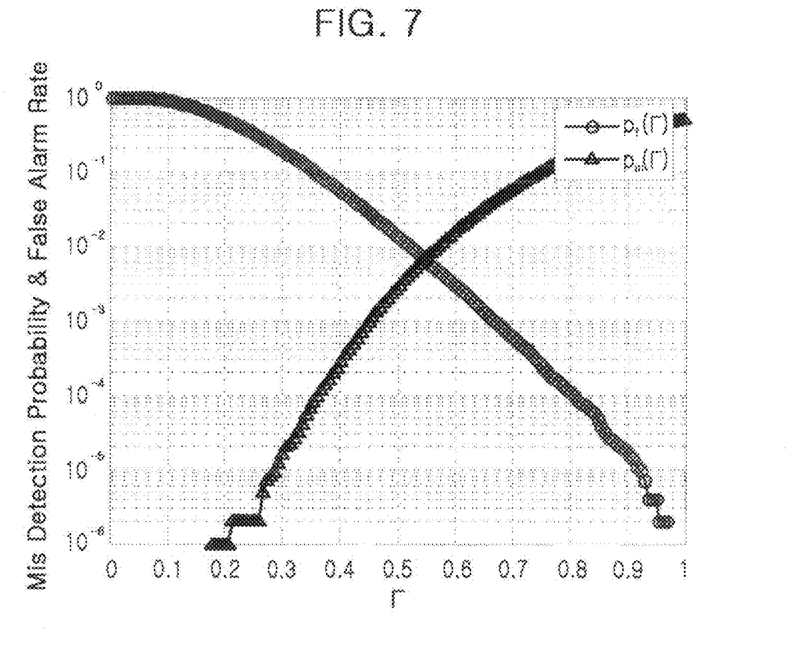
FIG. 7 is a graph showing receiver operation characteristic (ROC) curve for correlation analysis values in accordance with an embodiment of the present invention.

FIG. 7 is a graph showing receiver operation characteristic (ROC) curve for correlation analysis values in accordance with an embodiment of the present invention. Referring to FIG. 7, it is possible to confirm MDP and FAR according to the normalized threshold value, respectively. For performance assessment, $p_m(F)$ and $q_f(F)$ are inputted to the experimental analysis model. When SNR=3 dB and $N_F$=15, the performance assessment according to the threshold value and variation of $N_C$ is as shown in FIG. 8.

Figure 8:
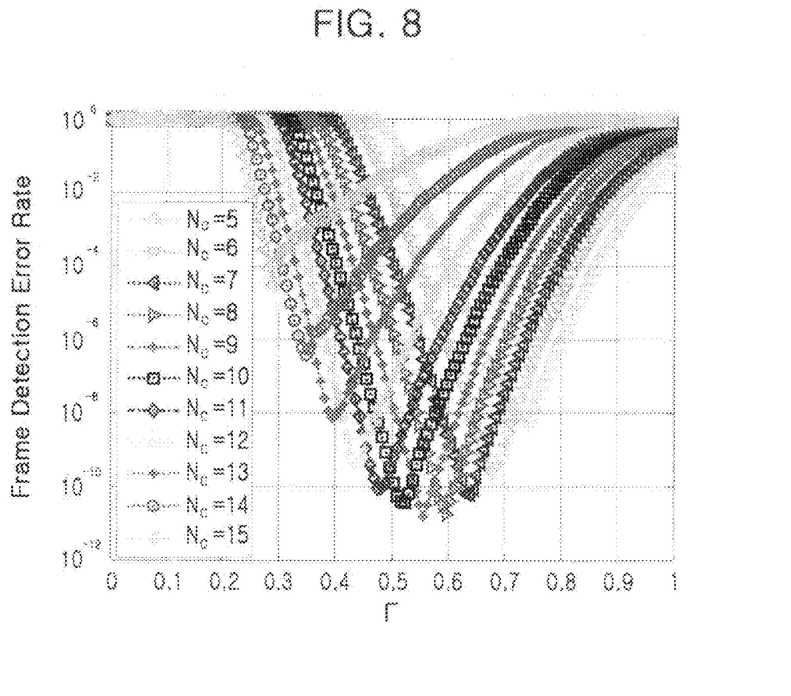
FIG. 8 is a graph showing a mis-detection probability performance analysis when the number of used frames is 15 in accordance with an embodiment of the present invention.

When 15 frames are used, FIG. 8 shows that frame detection error rate of about $1.2 \times 10^{-11}$ is acquired at $N_C$=9 and $\Gamma$=0.56.

This is analyzed as a case that frame detection is performed when more than 9 indexes are matched at 15 positions according to the frame detection method of the present invention. This means what detection is carried out although less than 6 detection errors occur at the 15 positions. Also, it means that when more than 9 false-alarms occur, detection is failed.

The method of the present invention can be realized as a program and stored in a computer-readable recording medium such as CD-ROM, RAM, ROM, floppy disks, hard disks, and magneto-optical disks. Since this process can be easily executed by those of ordinary skill in the art to which the present invention pertains, further description will not be provided herein.

The present application contains subject matter related to Korean Patent Application No. 10-2006-0124831, filed in the Korean Intellectual Property Office on Dec. 8, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for detecting frame sync and frame structure, comprising the steps of:
    calculating differential correlation values of reception symbols;
    generating index sequences of reception symbols whose differential correlation values calculated above exceed a threshold value;
    calculating positions estimated as frame start points which correspond to a total frame number based on the number of symbols per frame for each frame structure; and
    detecting frame sync and frame structure based on the number of positions where the above-calculated frame start point estimated positions and the above-generated index sequences are matched.

2. The method of claim 1, wherein in the step of detecting frame sync and frame structure,
    the number of indexes matched with positions as many as the number of frames is counted, and a time point where a counted number exceeds the number of the matched indexes is decided as a detection time point.

3. The method of claim 1, wherein in the step of calculating differential correlation values,
    differential correlation values between symbols whose symbol index are different by 1 and symbols whose symbol index are different by 2.

4. The method of claim 1, wherein in the step of generating index sequences of reception symbols includes the steps of:
    checking whether the above-calculated differential correlation values exceed the threshold value;
    when the differential correlation values do not exceed the threshold value, increasing the position numbers of the symbols by 1 and calculating correlation values at next symbol positions; and
    when the differential correlation values exceed the threshold value, storing corresponding symbol indexes.

5. The method of claim 1, wherein the frame structure is variable according to at least any one selected from the group consisting of a modulation scheme, data length, number of symbols per frame, presence of a pilot symbol.

* * * * *